US010232491B2

(12) United States Patent
Wiand

(10) Patent No.: US 10,232,491 B2
(45) Date of Patent: Mar. 19, 2019

(54) RETRUING OF A GRINDING WHEEL USING EDM MACHINE

(71) Applicant: Inland Diamond Products Company, Madison Heights, MI (US)

(72) Inventor: Ronald C. Wiand, Troy, MI (US)

(*) Notice: Subject to any disclaimer, the term of this patent is extended or adjusted under 35 U.S.C. 154(b) by 213 days.

(21) Appl. No.: 15/168,854

(22) Filed: May 31, 2016

(65) Prior Publication Data

US 2016/0346900 A1 Dec. 1, 2016

Related U.S. Application Data

(60) Provisional application No. 62/168,172, filed on May 29, 2015.

(51) Int. Cl.
| | |
|---|---|
| *B24B 53/00* | (2006.01) |
| *B23H 7/12* | (2006.01) |
| *B23H 9/02* | (2006.01) |
| *B24B 5/00* | (2006.01) |
| *B24B 53/047* | (2006.01) |
| *B23H 1/04* | (2006.01) |

(52) U.S. Cl.
CPC .......... *B24B 53/001* (2013.01); *B23H 7/12* (2013.01); *B23H 9/02* (2013.01); *B24B 5/00* (2013.01); *B24B 53/047* (2013.01); *B23H 1/04* (2013.01)

(58) Field of Classification Search
CPC ....... B24B 5/00; B24B 53/001; B24B 53/047; B23H 7/12; B23H 9/02; B23H 1/04
USPC .......................... 82/1.11; 76/47.1, 50; 409/50
See application file for complete search history.

(56) References Cited

U.S. PATENT DOCUMENTS 3,398,253 A * 8/1968 Rye .................... B23H 1/00
219/69.17
4,332,110 A 6/1982 Flinchbaugh
(Continued)

FOREIGN PATENT DOCUMENTS

| JP | 05-277938 A | * | 10/1993 |
|---|---|---|---|
| JP | H05277937 A | | 10/1993 |

(Continued)

OTHER PUBLICATIONS

Machine translation of Japan Patent document No. 06-008,141, Mar. 2018.*

(Continued)

*Primary Examiner* — Geoffrey S Evans
(74) *Attorney, Agent, or Firm* — Warn Partners, P.C.

(57) ABSTRACT

A process for retruing a profile in an abrasive wheel is provided. A lathe table including an edged cutting tool is used for fixturing a grinding wheel having an outside metal edge and an abrasive matrix adjacent thereto for rotation along an axis compatible for lathe removal of material at at least the outside edge of said wheel. A predetermined amount of material along said edge with the edged lathe cutting tool is removed using the lathe cutting tool. A rotating electrical discharge profiling tool which is attached to an electrical discharge machine is used for profiling of the wheel by electrical discharge machining of the abrasive surface with the rotating electrode. The process uses a machine specifically designed for electrical discharge machining of the profile. The machine also has a mechanism cutting a predetermined profile into the electrode without removing it from the machine.

19 Claims, 8 Drawing Sheets

(56) References Cited

U.S. PATENT DOCUMENTS

| | | | | |
|---|---|---|---|---|
| 4,509,126 A | * | 4/1985 | Olig | G05B 19/4163 318/561 |
| 4,641,007 A | * | 2/1987 | Lach | B23H 5/04 204/217 |
| 4,813,188 A | * | 3/1989 | Becker | B24B 3/045 451/217 |
| 4,849,599 A | * | 7/1989 | Kuromatsu | B23H 5/06 204/212 |
| 4,963,710 A | * | 10/1990 | Lach | B24B 47/22 219/69.16 |
| 5,045,664 A | * | 9/1991 | Nakagawa | B24B 53/001 219/69.15 |
| 6,244,939 B1 | * | 6/2001 | Ohmori | B24B 53/001 451/443 |
| 6,358,133 B1 | * | 3/2002 | Cesena | B24D 3/06 451/450 |
| 2002/0078940 A1 | | 6/2002 | Voigt | |
| 2004/0097167 A1 | | 5/2004 | Yamada | |
| 2013/0217315 A1 | | 8/2013 | Wiand et al. | |

FOREIGN PATENT DOCUMENTS

| | | | |
|---|---|---|---|
| JP | 06-008141 A | * | 1/1994 |
| JP | 07-052040 A | * | 2/1995 |
| WO | WO-99/29469 A | * | 6/1999 |

OTHER PUBLICATIONS

Srivastave, "Review of Dressing and Truing Operations for Grinding Wheels", Jan. 2013, International Journak of Engineering Science and Technology (IJEST), vol. 5, No. 01, pp. 8-19, ISSN: 0975-5462.*

Wang, "EDM Dressing of Fine Grain Super Abrasive Grinding Wheel", Jan. 1996, Elsevier, Journal of Materials Processing Technology, vol. 62, pp. 299-302.*

* cited by examiner

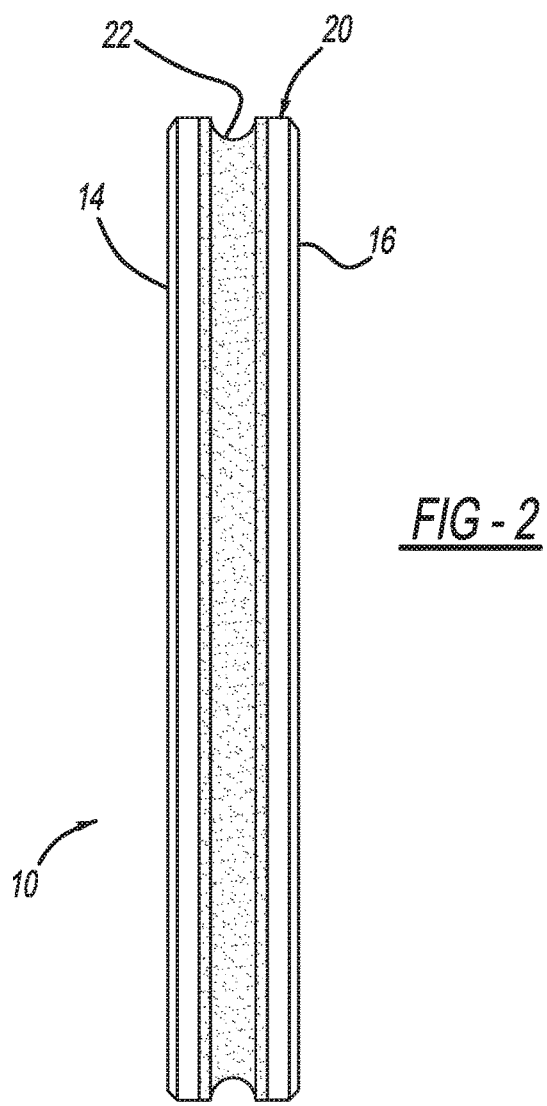
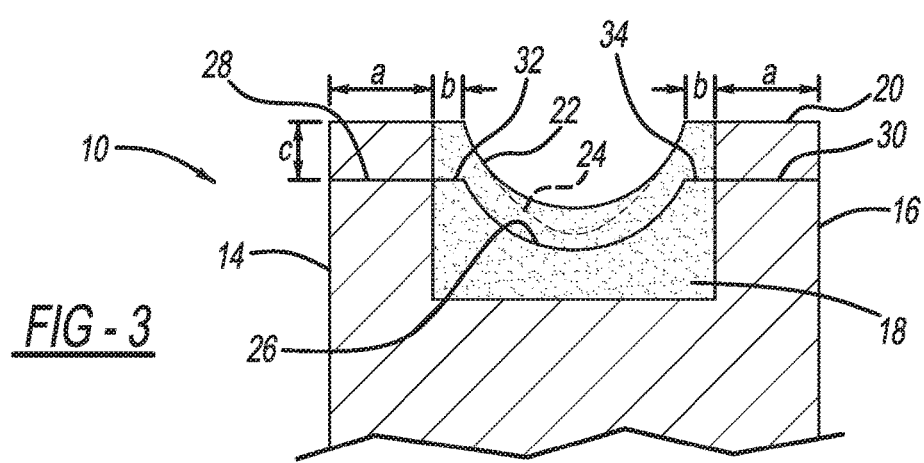

RETRUING OF A GRINDING WHEEL USING EDM MACHINE

CROSS REFERENCE TO RELATED APPLICATIONS

This application claims the benefit of U.S. Provisional Application No. 62/168,172, filed May 29, 2015. The disclosures of the above application are incorporated herein by reference.

FIELD OF THE INVENTION

The present invention relates to retruing of diamond grinding wheels.

BACKGROUND OF THE INVENTION

Diamond grinding wheels with abrasive grit matrix cutting surfaces sandwiched between outer steel walls are commonly used in glass edging operations. In recent years these wheels have become useful in edging contours in solar energy panels where precision grinding is essential. The cost of solar panels is high due to the value added processes during production. In addition, any quality issues with the edge profile grinding wheels has become more critically problematic than in the past, such as when edge grinding a more decorative surface of a glass table top, automobile lights, window or even an ophthalmic lens.

Because of the quantity of solar panels being produced and the ever increasing cost of diamond grit materials, retruing of out of specification diamond matrix profiling wheels has become an important function in the manufacture of precision ground solar panels and the like.

Past methods or retruing the wheels typically involve using an abrasive grit grinding wheel to remove the outside metal material and rough profile of a grinding wheel and thereafter to re-profile the proper grove or edge cutting pattern into the matrix.

This process has generally been acceptable. However, the wheels resurfaced by this process and the cost of grinding wheels for retruing is problematic.

Therefore, there remains a need in the art to provide a more precise, cost effective process for retruing of edge profiling grinding wheels which provides superior service capabilities for edge grinding of solar panels and other glass surfaces.

SUMMARY OF THE INVENTION

A process for retruing a profile in an abrasive wheel is provided. A lathe table including an edged cutting tool is provided. A grinding wheel is operably fixtured, the grinding wheel having an outside metal edge and an abrasive matrix surface adjacent thereto for rotation along and axis compatible for lathe removal of material on at least the outside edge of said wheel. A predetermined amount of material along the edge of the grinding wheel is removed with the edged lathe cutting tool. The process further includes providing a rotating electrical discharge profiling tool attached to an electrical discharge machine ("EDM"), for rotating the profiling tool along an axis in a direction to provide electrical discharge profiling of the abrasive matrix surface of the wheel. Then profiling of the wheel by electrical discharge machining of the abrasive matrix surface with a rotating electrode.

The process uses a machine specifically designed for electrical discharge machining of the profile. The machine has parallel rotating axes for simultaneous rotation of a wheel to be trued and an electrode having a profile for retruing of the surface of the wheel. The machine also has a mechanism for contacting of the discharge machine electrode cutting surface and cutting a predetermined profile into the surface. This provides a simpler electrical discharge machine for this purpose which provides a precise electrode surface which can be reformed or touched up without removing and replacing the electrode in the machine.

The process is equally applicable for abrasive wheels with only one side wall being steel. However, explained herein is a process where both sides of the wheel are steel, aluminum, copper, steel, stainless steel or alloys of these with a profiling surface in between.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a side view showing the abrasive surface of the wheel with contour lines showing the abrasive contour of the wheel;

FIG. 3 is a detailed sectional view of the wheel of FIG. 2;

DETAILED DESCRIPTION OF THE PREFERRED EMBODIMENTS

The following description of the preferred embodiment(s) is merely exemplary in nature and is in no way intended to limit the invention, its application, or uses.

Figure 1:
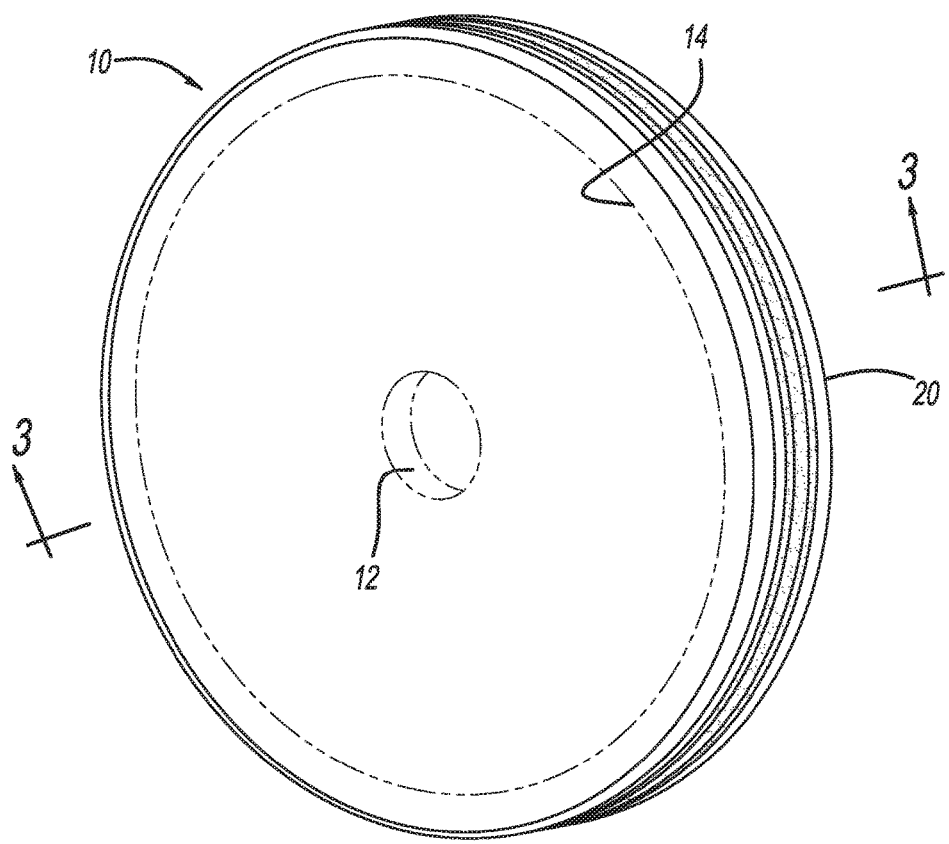
FIG. 1 is a perspective view of a pencil edging wheel of the type retrued in the present invention.

A typical edge profiling wheel is show generally at 10 or "wheel" in FIGS. 1-3. The wheel includes a central mounting orifice 12 which mounts to an arbor for rotating the wheel about an axis A-A. The wheel 10 has outer sides 14 and 16 which are metal, preferably, steel, and an abrasive matrix material 18 which is a sintered metal abrasive grit matrix at the outer peripheral edge 20 of the wheel 10. At this outer peripheral edge 20 the steel sides 14 and 16 have a thickness "a" and the matrix has a concave working profile section 22 with outer peripheral edges having a thickness "b". During use of the wheel 10 the working surface 22 becomes worn such as to a "V" like surface configuration shown at 24 or otherwise worn. When the wheel 10 becomes worn the working surface 22 must be retrued to the original profile such as that shown at 26. Along with this retruing, the outer peripheral profile is reduced by a distance "c" to form outer steel walls 28 and 30 and abrasive matrix walls 32 and 34 and the profiling surface 26. In the present invention the wheel 10 is retrued using the process as follows.

Figure 4:
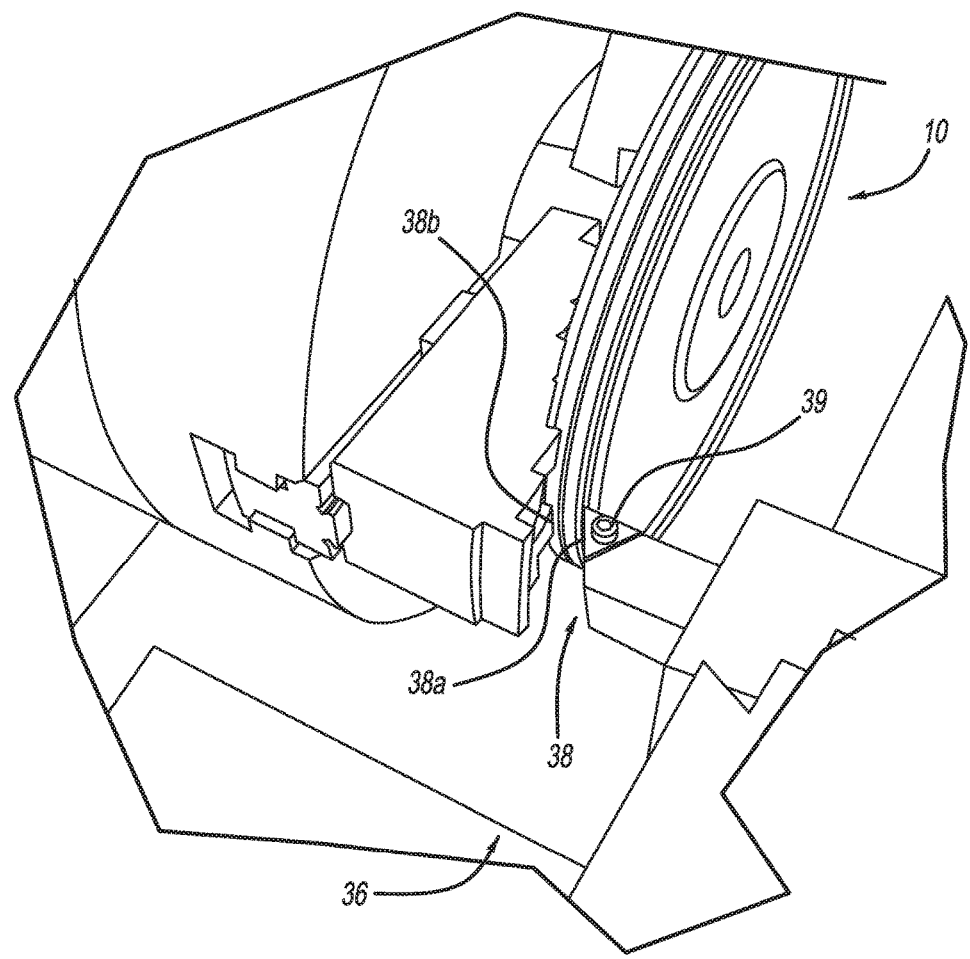
FIG. 4 is a perspective view of the wheel being edge machined on a lathe as a first step of the present process.

Referring now to FIG. 4, a lathe device shown generally at 36 or "lathe table" or "lathe" is provided that is operable to take off the width "a" to a depth "c" steel from the outer sides 14 and 16 of the wheel 10 to form the surfaces 28 and 30. The lathe 36 can be used to take off material from the sides one side at a time or both sides at once from either an axial or longitudinal direction. The steel sides 28 and 30 of the wheel 10 are the only parts which are removed by the lathe process. The lathe process removes the majority of the steel without disturbing the more sensitive matrix 18 material. While it depends on the extent of the wear in the abrasive wheel 10, generally the dimension "c" is from 10 to 100 thousandths of an inch and typically 50 to 70 thousandths of an inch.

The lathe 36 includes at least one edged cutting tool 38 with at least one cutting edge 38*a* to cut off part of the wheel 10 as the wheel 10 is held by an opposing edge 38*b*. The cutting edge 38*a* is operably shaped and located to take off the predetermined depth and dimensions (i.e., "a" and "c") from the wheel 10 to form the respective one of the surfaces 28 and 30 as the wheel 10 rotates. According to another embodiment, at least two cutting edges 38*a* and 38*b* are operably shaped and located to take off the predetermined depth and dimensions (i.e., "a" and "c") from the wheel 10 to form the both surfaces 28 and 30 at the same time as the wheel 10 rotates. The cutting edge 38*a* portion is connected by at least one fastener 39, according to an embodiment of the invention, and is removable to change out for maintenance, repair or when a different cutting surface configuration is desired depending on the application.

Figure 5:
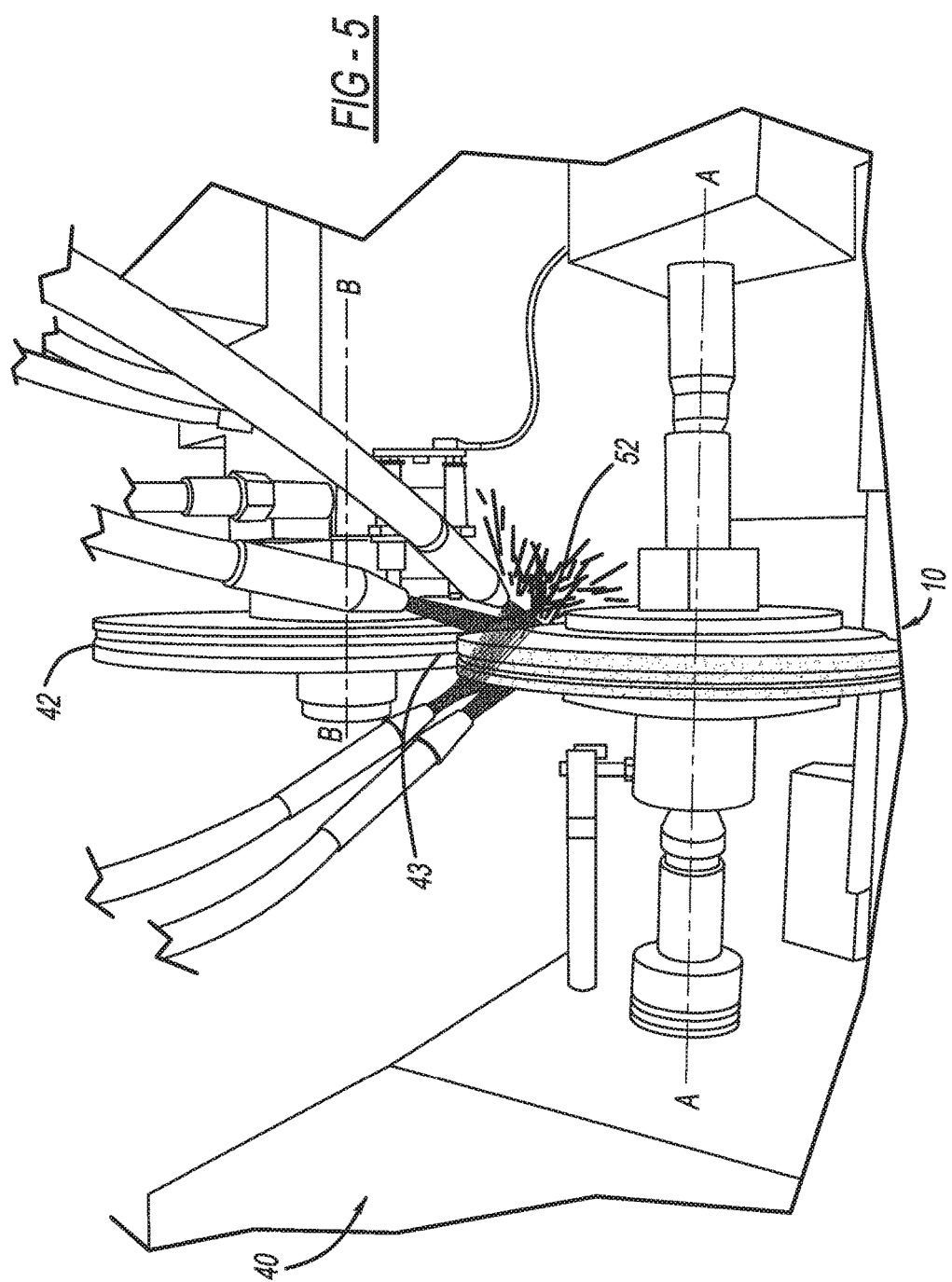
FIG. 5 is a front perspective view of a wheel getting retrued in accordance with the teachings of the present invention.
Figure 6:
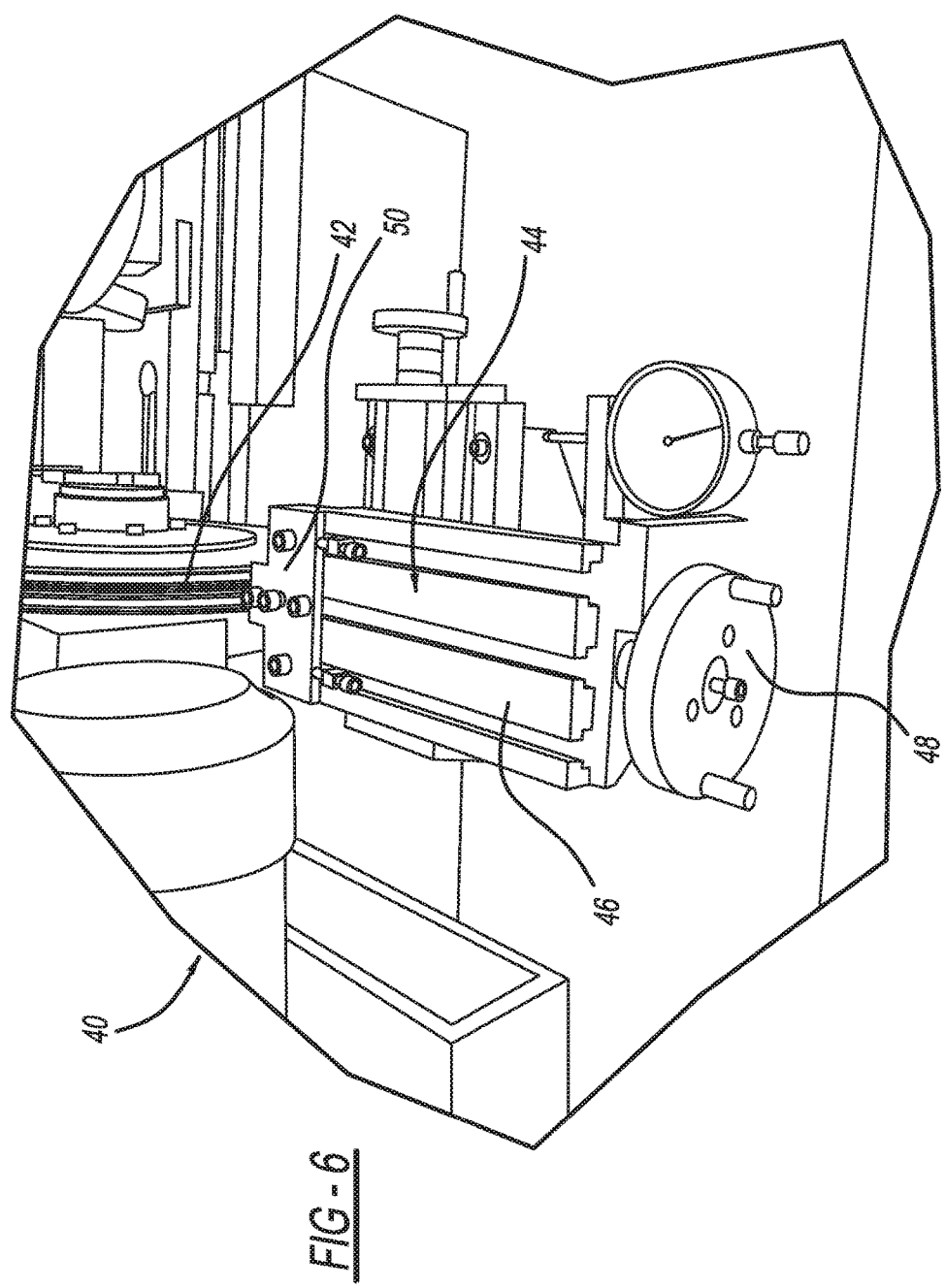
FIG. 6 is a rear perspective view of the machine which illustrates the profile forming of the electrode.
Figure 7:
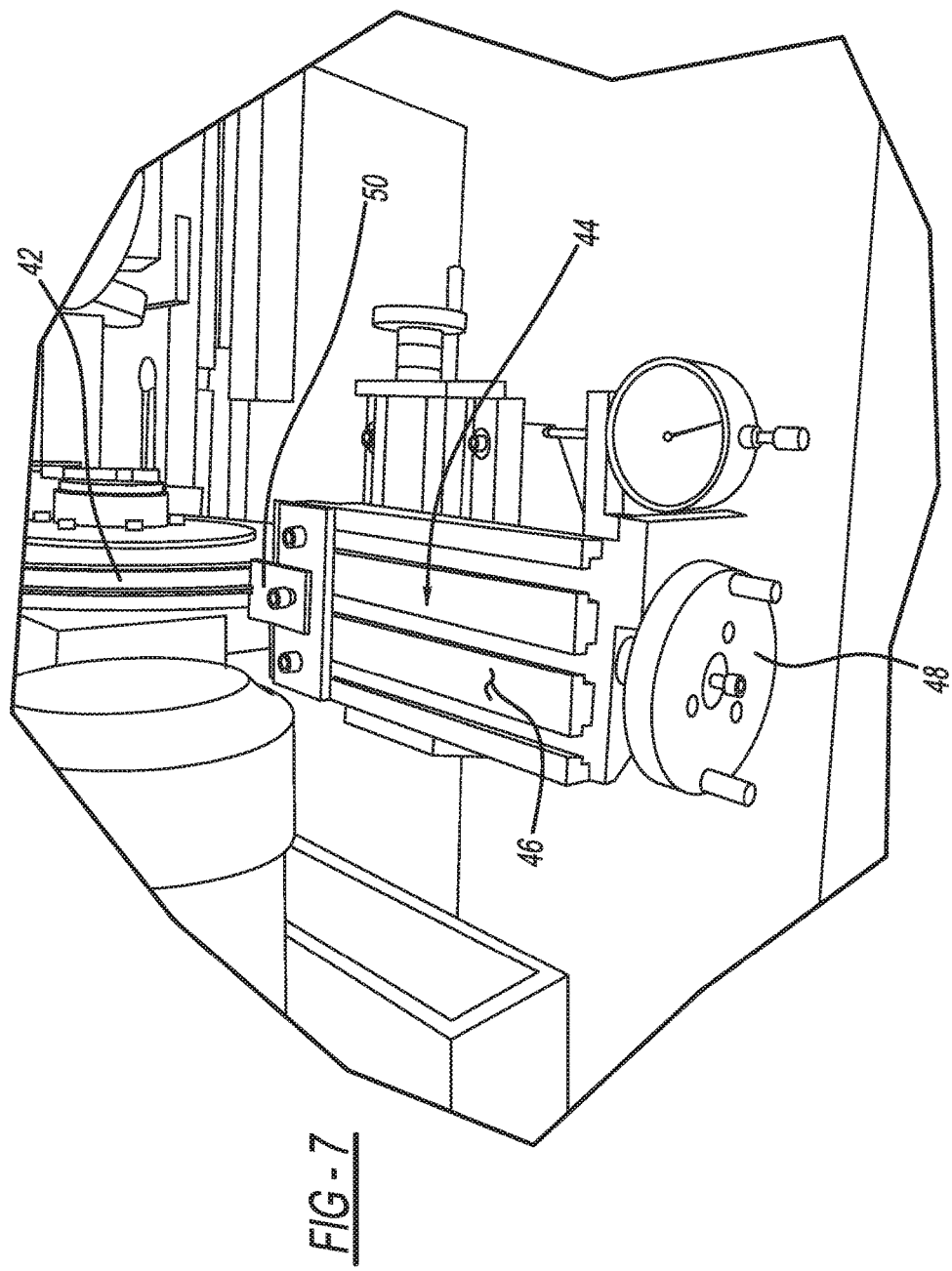
FIG. 7 is a perspective view similar to FIG. 6 showing profiling of the graphite electrode.
Figure 8:
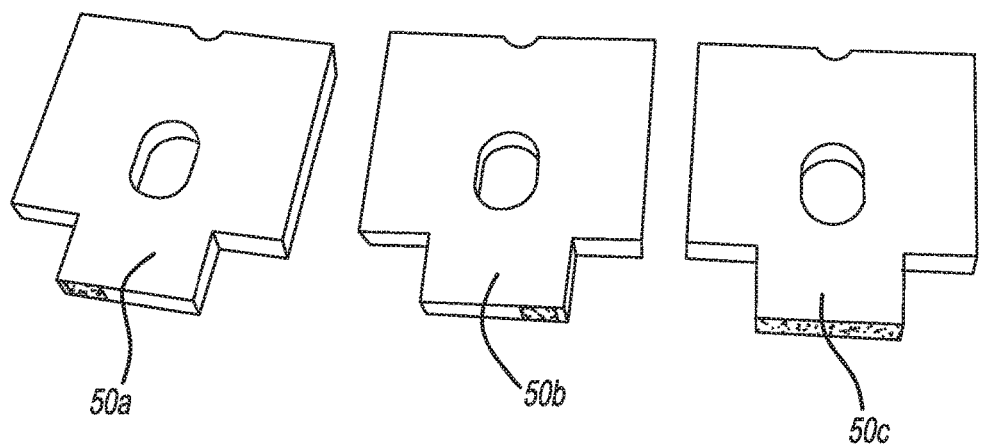
FIG. 8 is a figure showing electrode profiling tools useful in the present invention.

Referring now to FIGS. 5 and 6, a specialized electric discharge machining apparatus shown generally at 40 or "machine" is provided and includes an electrical discharge profiling tool 42 or "electrode". The electrical discharge machine 40 is configured for controlled rotation along the first axis A-A of the profiling wheel 10 to be retried. The machine 40 is adapted for rotation of the profiled electrode 42 in a parallel axis B-B such that the electrode 42 can be contacted to the wheel 10 to be profiled. Thus, the machine 40 is adjustable for aligning the electrode 42 with the wheel 10 and then moving the electrode 42 toward the wheel 10 while both are turning and the electrical discharge is on to provide machining of the surface. The electrode 42 has an outer circumferential profile shown generally at 43 for contacting the profile to be retrued of the abrasive wheel 10 by electrical discharge machining. In the present invention the apparatus 40 has an electrode reforming apparatus shown generally at 44 in FIGS. 6 and 7 which is diametrically opposed to the contact point of the electrode 42 with the wheel 10. The electrode reforming apparatus 44 includes at least one table 46 which is moveable by a handle 48 toward and away from the electrode 42. At least one cutting tool mechanism 50 or "cutting tool" is secured to the table 46, e.g., by a plurality of fasteners, and is adapted for selectively contacting and reforming the contour of the electrode 42 by moving the cutting tool 50 into engagement with the electrode 42 to provide a predetermined contour in the electrical machining surface of the electrode 42. FIG. 8 illustrates various profiling tools 50*a*, 50*b*, 50*c* which are used depending on the type of wheel being retrued by the electrode 42. It is appreciated that the cutting tool 50 can be positioned in alternative orientations depending on the application such as with the cutter edge upward or angled at 6 degrees.

As will be appreciated by those skilled in the art a graphite electrode 42 is used and is oversized and generally from 8 to 12 inches in diameter. This allows the profile of the electrode 42 to be touched up, re-profiled or even reshaped many times without changing the electrode 42 which is a time consuming process. The electrode 42 can be made of other materials such as copper, steel or alloy materials which are useful as electrodes in EDM machining.

Figure 10:
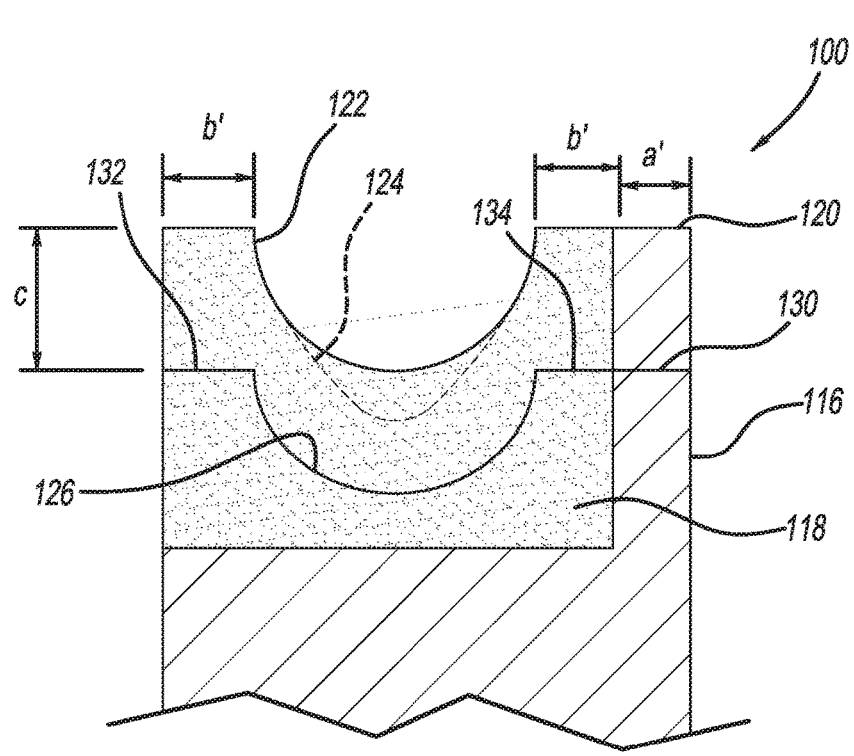
FIG. 10 is a detailed sectional view of the wheel of FIG. 9.
Figure 9:
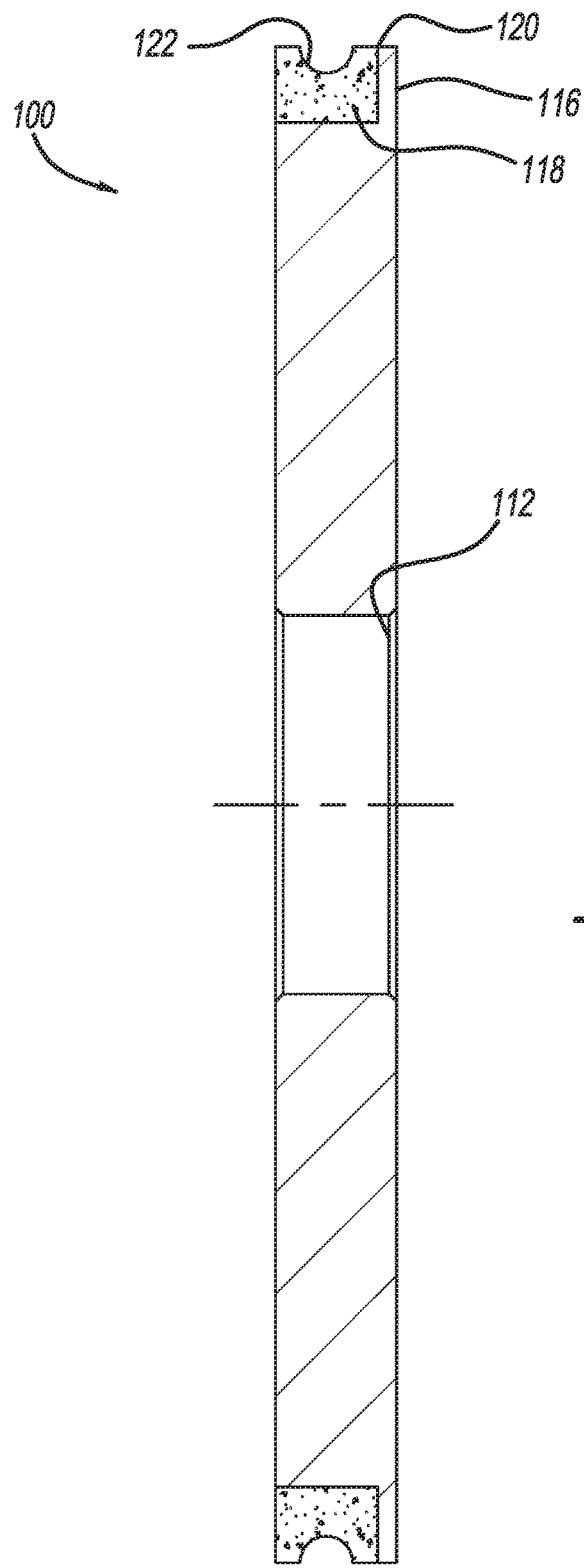
FIG. 9 is a side view of another pencil edging wheel of the type retrued in the present invention.

Referring to the figures generally, in accordance with the present invention there is provided a process for retruing a profile 26 in an abrasive wheel 10 which has the steps of: first providing a lathe table 36 including an edged cutting tool 38. As stated above the cutting tool 38 is used to cut off a portion "c" of the material from the steel side of the wheel 10. The process is equally applicable for cutting wheels with only one side wall being steel (such as shown in FIGS. 9 and 10). The wheel 10 is mounted in the lathe 36 for rotating the wheel 10 and the cutting tool 38 is used to remove material from the steel for a distance "a" inward and a distance "c" downward. This can be done one side at a time or both sides at a time in a radial or axial direction.

Next a rotating electrical discharge profiling electrode 42 is attached along axis B-B parallel to axis A-A and aligned with the outer peripheral edge of the abrasive wheel 10. The wheel 10 is attached to an electrical discharge machine 40, for rotating the profiling tool along an axis in a direction to provide electrical discharge profiling of the abrasive surface of the wheel 10; and, profiling of the wheel 10 by electrical discharge machining of the abrasive surface 18 with the rotating electrode 42 while the wheel 10 prepared by the lathe process is also rotated is then accomplished using standard EDM machining processes to provide a finished retrued abrasive wheel with a new spec profile. EDM coolant 52 is used to remove the swarf generated by the process.

The machine 40 provides adjustment of rotation and current to the electrode 42 and also rotation speed to the abrasive wheel 10. There is also an adjustment for bringing the working surface of the electrode 42 and the working face 18 of the abrasive wheel 10 into contact with one another to provide the proper distance for EDM machining. Thus, the operator must select the proper combination of rotations, gap and current to be used to provide the proper finished profile. A finished profile can typically be achieved in one rotation of the abrasive wheel 10 using the present process. It will be readily appreciated that while the process shows use with a concave abrasive surface any contour and convex surfaces may also be machined using the process of the present invention. Thus, any type of glass cutting wheels normally used in glass for various applications in windows table tops or other uses may be retrued using the process of the present invention.

Another typical edge profiling wheel is shown generally at 100 or "wheel" in Figures. The wheel 100 is substantially the same as the wheel 10, however, the abrasive matrix material 118 profile is different and there is only one outer wall 116. Any other type of profile style and outer wall configurations, contours and profiles depending on the application are within the scope of the present invention.

The wheel 100 includes a central mounting orifice 112 which is mountable to an arbor for rotating the wheel a 100. The wheel 100 has one outer side 116 which is steel and an abrasive matrix material 118 which is a sintered metal abrasive grit matrix (e.g., sintered diamond matrix) at the outer peripheral edge 120 of the wheel 100. At this outer peripheral edge 120 the steel side 116 has a thickness "a" and the matrix 118 has a concave working profile section 122 with outer peripheral edges having a thickness "b". During use of the wheel 100 the working surface 122 becomes worn such as to a "V" like surface configuration shown at 124 or otherwise worn configuration. When the wheel 100 becomes worn the working surface 122 must be retrued to the original profile such as that shown at 126. Along with this retruing, the outer peripheral profile is reduced by a distance "c" to form outer steel wall 130 and abrasive matrix wall 134 and the profiling surface 126. In the present invention the wheel 100 is retrued using the process as described previously.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process for retruing a profile in an electrically conductive abrasive wheel comprising:
   providing a lathe table including at least one edged cutting tool;
   fixturing the wheel having at least one outside metal edge and an abrasive grit matrix adjacent thereto for rotation along an axis compatible for lathe removal of metal material at at least the outside edge of the wheel;
   removing a predetermined amount of material along the outside edge with the edged cutting tool;
   providing a rotating electrical discharge profiling tool attached to an electrical discharge machine, for rotating the electrical discharge profiling tool along an axis in a direction to provide electrical discharge profiling of an abrasive surface of the abrasive grit matrix of the wheel; and,
   profiling of the wheel by electrical discharge machining of the abrasive surface with the rotating electrical discharge profiling tool.

2. The process for retruing a profile in an abrasive wheel of claim 1, wherein the abrasive wheel is rotated along the axis for profiling.

3. The process for retruing a profile in an abrasive wheel of claim 1, wherein the electrical discharge profiling tool is graphite, copper or a mixture of copper and graphite.

4. The process for retruing a profile in an abrasive wheel of claim 1, wherein the electrical discharge profiling tool is formed to a retruing profile prior to machining the profile in the wheel.

5. The process for retruing a profile in an abrasive wheel of claim 4, further comprising providing a cutting tool operably mounted at an angle operable for selectively retruing the profile of the electrical discharge profiling tool.

6. The process for retruing a profile in an abrasive wheel of claim 1, wherein the wheel has two outside metal edges and a predetermined amount of material along both outside metal edges are removed with the edged cutting tool at the same time.

7. The process for retruing a profile in an abrasive wheel of claim 1, wherein the edged cutting tool removes the outside metal edges one side at a time.

8. The process for retruing a profile in an abrasive wheel of claim 1, further comprising,
   providing the electrical discharge machine with an electrode reforming apparatus comprising:
      a table which is moveable toward and away from the electrical discharge profiling tool; and,
      at least one cutting tool secured to the table and adapted for selectively contacting and reforming the contour of the electrical discharge profiling tool;
   moving the table to bring the cutting tool into engagement with the electrical discharge profiling tool for retruing the electrical discharge profiling tool to a predetermined profile prior to machining the profile in the wheel.

9. The process for retruing a profile in an abrasive wheel of claim 1, further comprising, providing a coolant flow to remove swarf from the electrical discharge profiling tool and wheel generated by the process.

10. The process for retruing a profile in an abrasive wheel of claim 1, wherein the lathe removes 10 to 100 thousandths of an inch of metal material.

11. The process for retruing a profile in an abrasive wheel of claim 1, wherein the lathe removes 50-70 thousandths of an inch of metal material.

12. The process for retruing a profile in an abrasive wheel of claim 1, wherein the abrasive grit is a sintered diamond matrix.

13. The process for retruing a profile in an abrasive wheel of claim 1, wherein the re-profiled surface of the wheel is substantially U-shaped.

14. A process for retruing a profile in an electrically conductive abrasive wheel comprising:
   providing a lathe device including at least one edged cutting tool;
   fixturing the wheel having at least one outside metal edge and an abrasive grit matrix adjacent thereto for rotation along an axis in a direction compatible for lathe removal of metal material at at least the outside edge of the wheel;
   removing a predetermined amount of material along the outside edge with the edged cutting tool;
   providing at least one cutting tool attached to an electrical discharge machine for selectively retruing a rotating electrical discharge profiling tool, said rotating electrical discharge profiling tool attached to the electrical discharge machine for rotating the electrical discharge profiling tool along a parallel axis in a direction to provide electrical discharge profiling of an abrasive surface of the abrasive grit matrix of the wheel;
   profiling the electrical discharge machine with the cutting tool; and,
   profiling of the wheel by electrical discharge machining of the abrasive surface with the rotating electrical discharge profiling tool,
   wherein the electrical discharge profiling tool and wheel are rotatable along the axis and parallel axis in the same or different directions.

15. The process for retruing a profile in an abrasive wheel of claim 14, wherein the abrasive wheel is rotated along the axis for profiling and the electrical discharge profiling tool is rotated along the parallel axis in the same direction.

16. The process for retruing a profile in an abrasive wheel of claim 14, wherein the electrical discharge profiling tool is graphite, copper or a mixture of copper and graphite.

17. A machine for retruing of a profile in an abrasive wheel comprising:
   an electrical discharge machine configured for controlled rotation of a profiling abrasive wheel to be retrued along a first axis;
   said machine including a spindle adapted for rotation of an electrode in a parallel axis to the first axis and said electrode having an outer circumferential profile for contacting the profile to be retrued of the abrasive wheel by electrical discharge machining;

a cutting tool mechanism adapted for contacting and reforming the contour of the electrode without removing the electrode from its spindle to provide a predetermined contour in the electrical machining surface of the electrode; and, an edged cutting tool adapted to remove a predetermined amount of material from the abrasive wheel.

18. The machine for retruing of a profile in an abrasive wheel of claim 17, further comprising a table to which the cutting tool mechanism is operably mounted, wherein the table operably selectively moves the cutting tool mechanism in to/out of engagement with the electrode.

19. The machine for retruing of a profile in an abrasive wheel of claim 17, wherein the cutting tool mechanism is located diametrically opposed to the abrasive wheel such that rotation of the electrode in a first direction allows the cutting tool mechanism to contour the electrode and rotation of the electrode in an opposite direction allows the electrode to retrue the abrasive wheel.

* * * * *